United States Patent [19]
Sugiyama

[11] Patent Number: 5,745,911
[45] Date of Patent: Apr. 28, 1998

[54] SYSTEM FOR PERFORMING SPELL CHECK FUNCTIONS ON A PRINTING DEVICE WITHOUT OPERATOR INTERVENTION

[75] Inventor: Noriyuki Sugiyama, Tokyo, Japan

[73] Assignee: Canon Kabushiki Kaisha, Tokyo, Japan

[21] Appl. No.: 445,791

[22] Filed: May 22, 1995

Related U.S. Application Data

[63] Continuation of Ser. No. 125,142, Sep. 23, 1993, abandoned, which is a continuation of Ser. No. 780,379, Oct. 23, 1991, abandoned, which is a continuation of Ser. No. 299,027, Jan. 19, 1989, abandoned.

[30] Foreign Application Priority Data

Jan. 20, 1988 [JP] Japan .......................... 63-8480

[51] Int. Cl.⁶ .................................. B41J 5/30; B41J 3/42
[52] U.S. Cl. .................... 707/533; 707/531; 400/63; 400/74
[58] Field of Search .................... 364/419.1, 419.11, 364/419.12; 400/63, 74, 83, 696, 697; 395/761, 792, 793, 794, 803

[56] References Cited

U.S. PATENT DOCUMENTS

| | | | |
|---|---|---|---|
| 4,728,209 | 3/1988 | Kumamoto et al. | 400/63 |
| 4,775,251 | 10/1988 | Suzuki et al. | 400/63 |
| 4,783,758 | 11/1988 | Kucera | 400/63 |
| 4,818,131 | 4/1989 | Sakai | 400/63 |
| 4,842,428 | 6/1989 | Suzuki | 400/63 |
| 4,847,766 | 7/1989 | McRae et al. | 364/419.17 |
| 4,859,091 | 8/1989 | Ueda | 400/63 |
| 4,887,920 | 12/1989 | McRae et al. | 400/63 |
| 4,913,566 | 4/1990 | Sakai et al. | 400/63 |
| 4,915,546 | 4/1990 | Kobayashi et al. | 400/697 |
| 5,060,154 | 10/1991 | Duncan, IV | 364/419.14 |

Primary Examiner—Robert A. Weinhardt
Assistant Examiner—Stephen R. Tkacs
Attorney, Agent, or Firm—Fitzpatrick, Cella, Harper & Scinto

[57] ABSTRACT

A printing device including a central processing unit, a first memory, a keyboard for inputting characters forming words, and symbols, which are stored in the first memory, a second memory, a printer, and an eraser. The printer prints the information stored in the first memory. The central processing unit determines whether a word printed by the printer means before the commencement of the printing of the next word is correctly spelled. The second memory contains a dictionary used by the central processing unit to determine whether the spelling of the word printed by the printer is correct. The eraser erases a part of or the entire printed word in response to the central processing means determining that the printed word is misspelled.

15 Claims, 7 Drawing Sheets

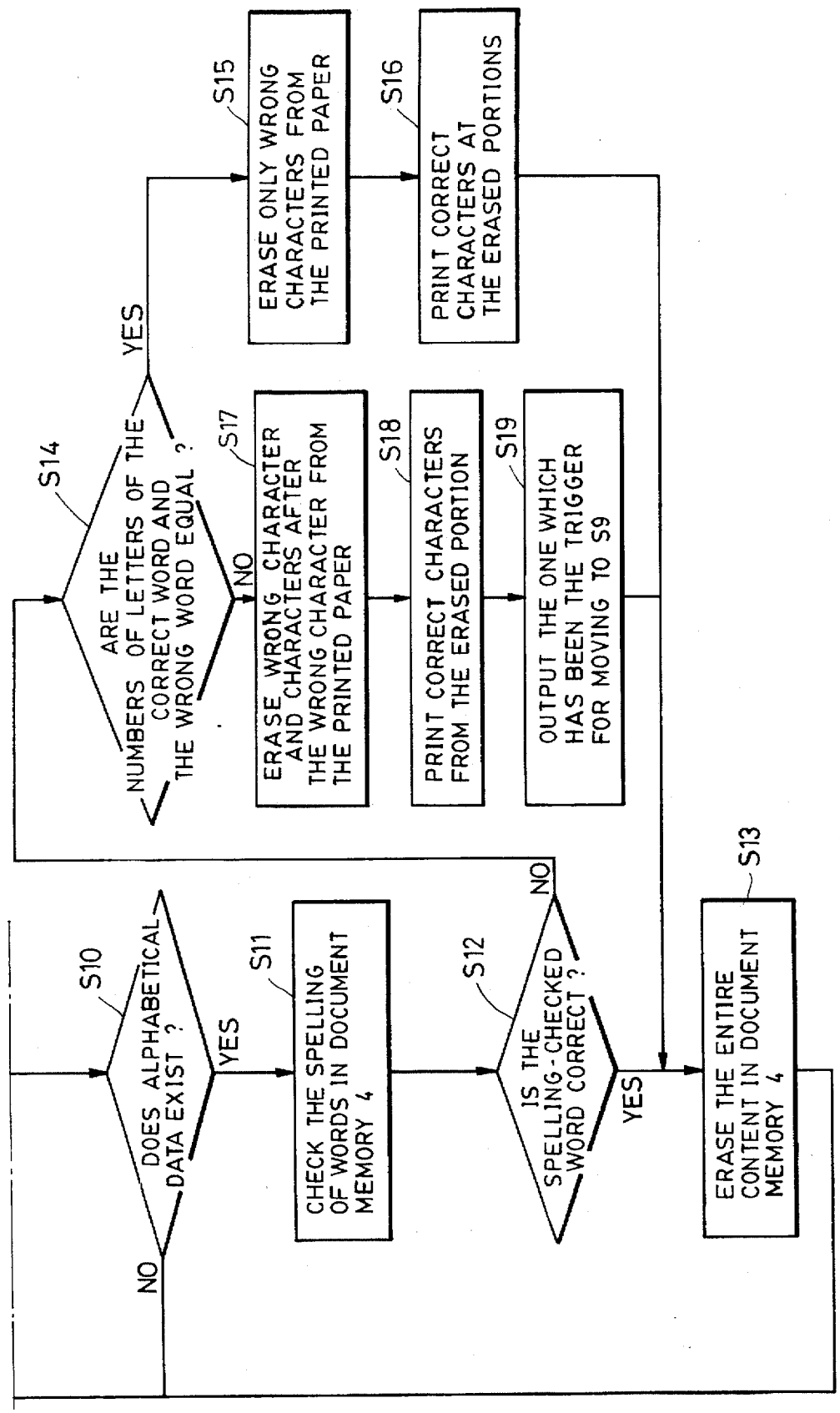

FIG. 4

CORRECT SPELLING                    MANUAL

WRONG PRINTING                      MAUAL

AFTER THE EXECUTION OF S17          MAUAL
                                    ERASURE

AFTER THE EXECUTION OF S18          MANUAL
                                    PRINTING OF
                                    CORRECT CHARACTERS

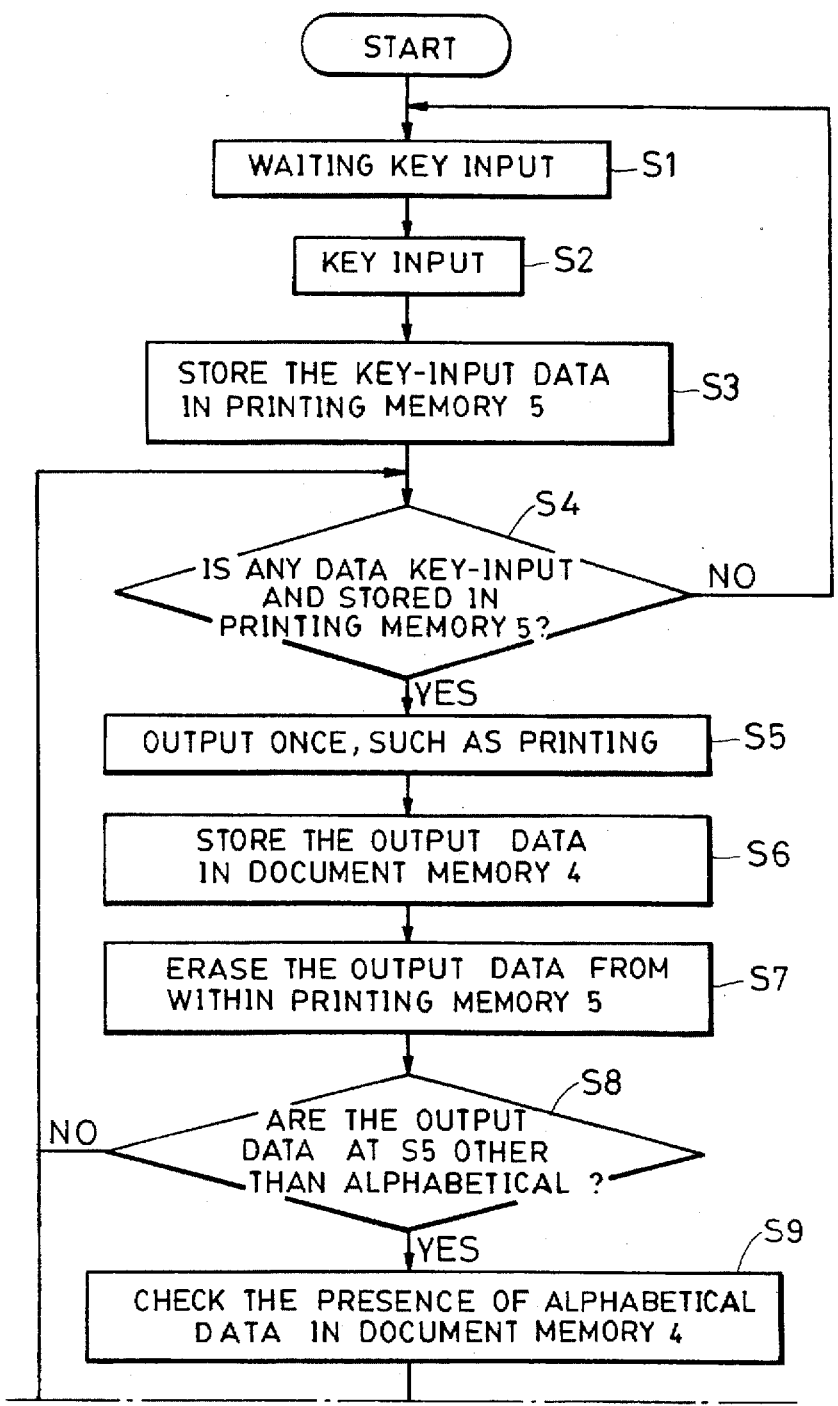

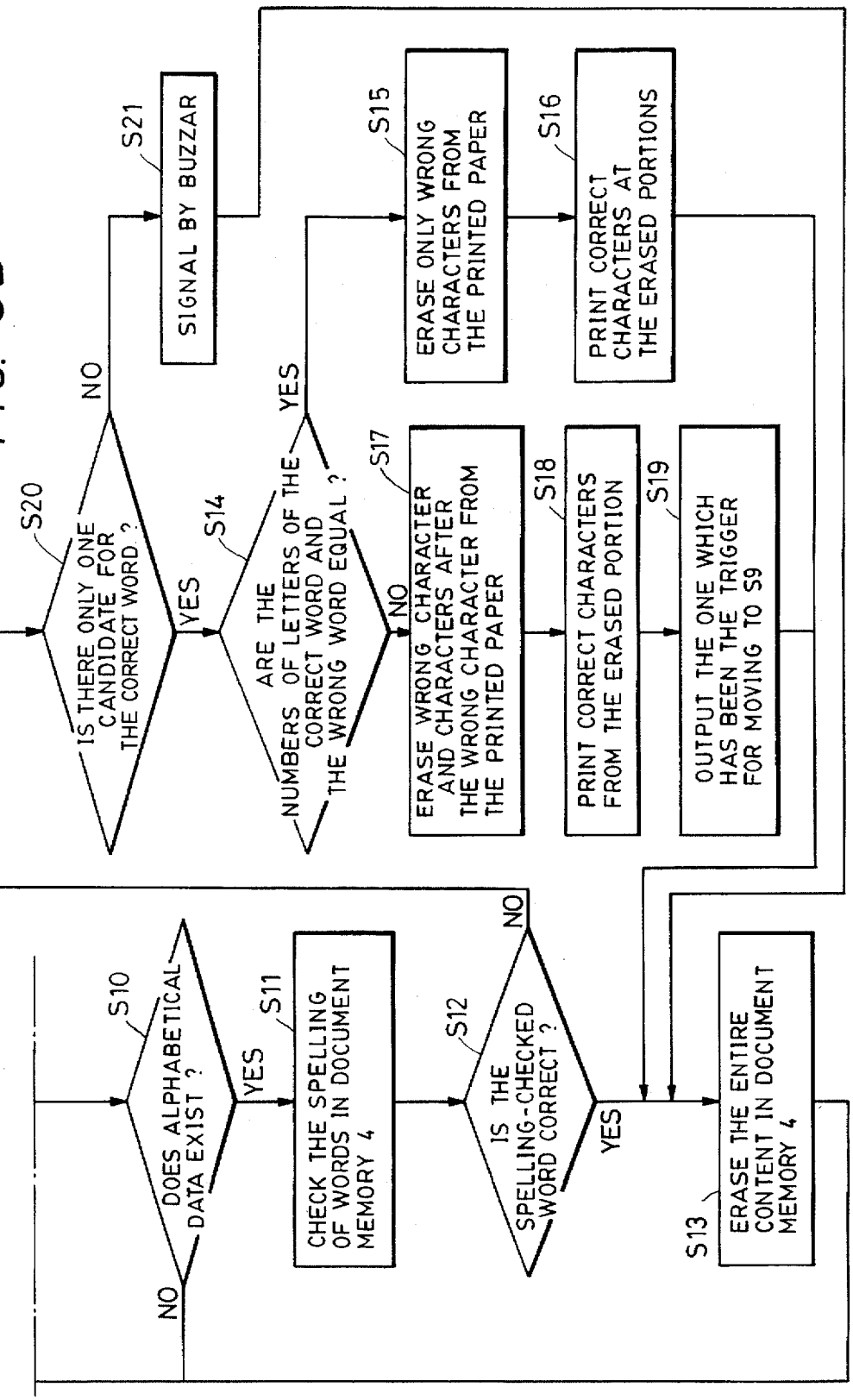

SYSTEM FOR PERFORMING SPELL CHECK FUNCTIONS ON A PRINTING DEVICE WITHOUT OPERATOR INTERVENTION

This application is a continuation of application Ser. No. 08/125,142 filed Sep. 23, 1993, now abandoned, which is a continuation of application Ser. No. 07/780,379 filed Oct. 23, 1991, now abandoned, which is a continuation of application Ser. No. 07/299,027 filed Jan. 19, 1989, now abandoned.

BACKGROUND OF THE INVENTION

1. Field of the Invention

This invention relates to a printing device having a spelling-check function, and more particularly relates to a printing device having a spelling-correction function.

2. Description of the Related Art

Heretofore, in a printing device having a spelling-correction function, such as an electronic typewriter or the like, a mistake in the spelling of a word which the typist has typed is discovered by a spelling-check function, and the occurrence of a misspelling is notified to the typist by a buzzer. Otherwise, after all key-input words have been printed, wrong-spelled portions are erased, and words having correct spellings are printed in the erased portions.

However, since the conventional electronic typewriter only notifies the typist of the occurrence of a wrong spelling by a buzzer, there is the disadvantage that the typist cannot precisely judge which word contains the wrong spelling in the case of high typing speed or the like. Further, in a system in which input from the keyboard is prevented when a misspelling has occurred, there is a disadvantage in that typing cannot be smoothly performed.

Furthermore, in a system in which, after all words have been printed, wrong words are erased, and then correct words are printed, there is the disadvantage that, in some cases, sufficient space cannot be reserved for printing correct words.

Moreover, in an electronic typewriter which does not have a display unit, such as an LCD or the like, there is the disadvantage that the indication of a wrong portion, such as which letter in the wrong word is wrong, cannot be performed. Further, even when the indication of a wrong portion is performed, there is the disadvantage that only providing an indication of a misspelling is insufficient, since the typist sometimes does not know the correct spelling of the wrong word.

SUMMARY OF THE INVENTION

It is an object of the present invention to solve the problems of the prior art.

It is a further object of the present invention to provide an improved printing device having a spell checking function.

It is a still further object of the present invention to provide a printing device, such as an electronic typewriter, which permits the typist to precisely determine the portion of a word that is misspelled when typing at a high speed.

It is still another object of the present invention to provide a printing device such as an electronic typewriter which performs spell checking while permitting the typist to type smoothly.

It is still a further object of the present invention to provide a printing device such as an electronic typewriter which performs spell checking and automatically reserves sufficient space for correcting misspelled words.

It is still another object of the present invention to provide a printing device such as an electronic typewriter which performs spell checking and indicates to the typist which portion of a word is misspelled without using a display unit.

It is still another object of the present invention to provide a printing device such as an electronic typewriter which performs spell checking, which indicates to the typist which portion of a word is misspelled without using a display unit, and which corrects the spelling of an incorrectly spelled word.

These and other objects are accomplished, according to one aspect of the present invention, by a printing device comprising input means for inputting a plurality of characters comprising words, and symbols; first storage means for storing information input by the input means; printing means for printing the information stored in the first storage means; determining means for determining whether a word printed by the printing means before the commencement of the printing of the next word is correctly spelled; second storage means for storing a dictionary used by the determining means to determine whether the spelling of the word printed by the printing means is correct; and erasing means for erasing a part of or the entire printed word in response to the determining means determining that the printed word is misspelled.

The device further comprises means for reading out a correct word, corresponding to the misspelled printed word, from within the second storage means after the erasure of a part of or the entire misspelled printed word by the erasing means, and for instructing printing a part of or the entire correct word at the erased portion by the printing means.

According to another object, the present invention relates to a printing device comprising: input means for inputting a plurality of characters comprising words and a plurality of symbols including punctuation symbols; output means for printing or erasing characters or symbols; determining means for determining whether the information indicating the punctuation of a word has been input or not by the input means; dictionary means for storing a plurality of correctly-spelled words; and checking means for checking the correctness of the spelling of a word which has been input utilizing the dictionary means after the determining means determines whether the punctuation information has been input by the input means. The checking means is arranged to recognize the misspelling of an input word and in response thereto, instructs the output means to erase at least a portion of the misspelled word in accordance with the difference in the number of characters between the misspelled word and a correctly spelled word corresponding to the misspelled word. The output means is arranged to perform an output operation each time a character or symbol is input by the input means and to terminate the output of a word by the output means in response to the recognition by said determining means of the input of a symbol representing a space recognized by the determining means.

According to another aspect, the present invention relates to a device comprising: checking means for checking the spelling of a word which has been printed; computing means for computing, when the checking means determines that the printed word is misspelled, the difference in the number of characters between a correct word corresponding to the misspelled printed word and the misspelled printed word; and erasing control means for erasing and controlling erasing so that when the number of characters in the misspelled printed word is different from the number of characters in the corresponding correct word according to the result of the operation of the computing means, a wrong character in the misspelled printed word and the portion of the misspelled printed word after the wrong character are erased. In addition, the erasing control means controls erasure such that when the number of characters in the misspelled printed word is equal to the number of characters in the corresponding correct word, only the wrong characters within the misspelled printed word are erased. Also provided is means for performing space processing after the erasing control means erases the portion of the misspelled printed word after a wrong character within the misspelled printed word, and then prints the correct characters.

BRIEF DESCRIPTION OF THE DRAWINGS

FIG. 3A is a first portion of a flow chart of an embodiment of the present invention;

FIG. 3B is a second portion of the flow chart shown in FIG. 3A;

FIG. 4 is a diagram showing an example of printing using the method shown in the flow chart in FIG. 3; and FIG. 5 is a diagram of the relationship between FIGS. 5A and 5B;

FIG. 5A is a first portion of a flow chart of another embodiment of the present invention;

FIG. 5B is a second portion of the flow chart shown in FIG. 5A.

DETAILED DESCRIPTION OF THE PREFERRED EMBODIMENTS

The present invention will be hereinafter explained in detail with reference to the drawings.

Figure 1:
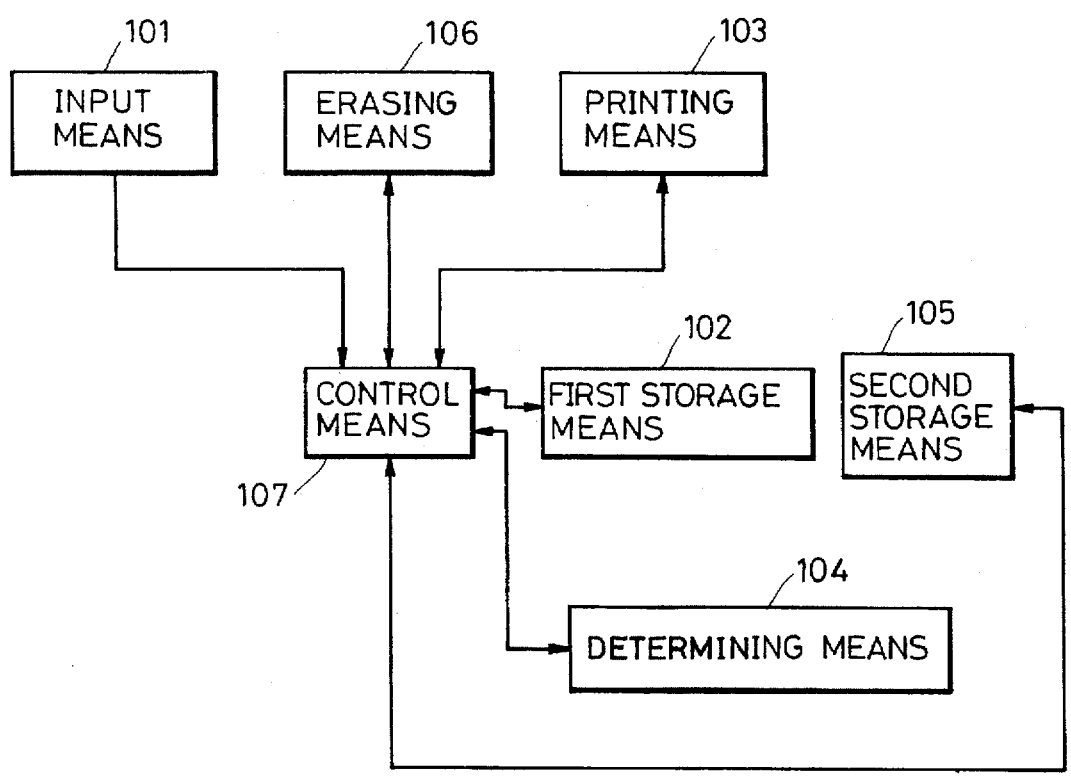
FIG. 1 is a block diagram of an electronic typewriter according to the present invention.

An electronic typewriter according to the present invention comprises, as shown in FIG. 1, input means 101 for inputting characters and symbols, first storage means 102 for storing the information input by the input means 101, printing means 103 for outputting and printing the information stored in the first storage means 102, determining means 104 for determining or checking whether a word printed by the printing means 103 is spelled correctly, second storage means 105 for storing a dictionary used as the criteria for the determining operation, erasing means 106 for erasing, when there is a mistake in the spelling of a printed word, a part of or the entire word according to the determination of the correctness of the word, and control means 107 for controlling such that, when there is a mistake in a word printed by the printing means 103 as a result of the determination by the determining means 104, a part of or the entire wrong word is erased by the erasing means 106, the correct word is read out from within the second storage means 105, and a part of or the entire correct word is printed at the erased portion, and thus the correction of the wrong word is performed. The electronic typewriter may also include a display unit.

Figure 2:
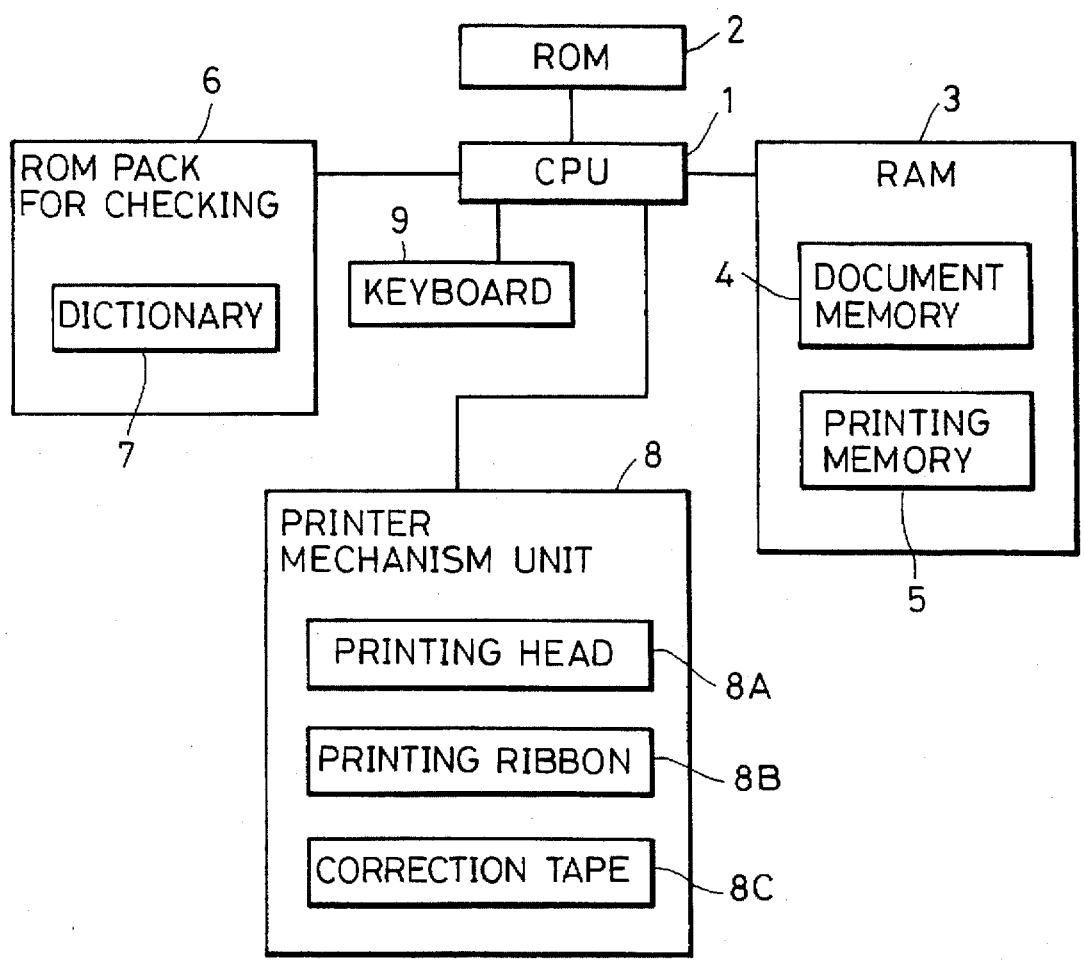
FIG. 2 is a block diagram of an example of a means for implementing the embodiment of the present invention shown in FIG. 1.

FIG. 2 shows the configuration of an example of the electronic typewriter, which does not include a display unit, such as an LCD or the like, of the embodiment of the present invention shown in FIG. 1. It is to be noted that the absence of a display unit is not a necessary condition of the present invention. Here, a CPU (a central processing unit) 1 directs the control of the entire device, such as is shown in FIG. 2 which will be described later, in accordance with programs stored in a ROM (a read-only memory) 2. A RAM (a random access memory) 3 includes a document memory 4 for storing input document information to be printed out and a printing memory 5. The printing memory 5 stores words before printing, and the document memory 4 stores documents after printing. It will be noted that the document memory 4 and the printing memory 5 are not necessarily separated. A pointer for indicating up to which point printing has been performed may be provided, and character data may be stored in a region of the RAM 3. In a ROM pack 6 used for checking document information, a dictionary 7 which contains criteria, such as words necessary for checking the correctness of words in the document memory 4, or the like, is stored. A printer mechanism unit 8 includes a printing head 8A, a printing ribbon 8B and a correction tape 8C. A keyboard 9 performs various instruction inputs to the present device. The electronic typewriter may also include a display unit for displaying the input document.

CPU 1 and ROM 2 correspond to control means 107, RAM 3 corresponds to first storage means 102, ROM pack 6 corresponds to second storage means 105, printer mechanism unit 8 corresponds to printing means 103, correction tape 8C corresponds to erasing means 106, and keyboard 9 corresponds to input means 101. in addition, determining means 104 corresponds to CPU 1 and ROM 2.

Figure 3:
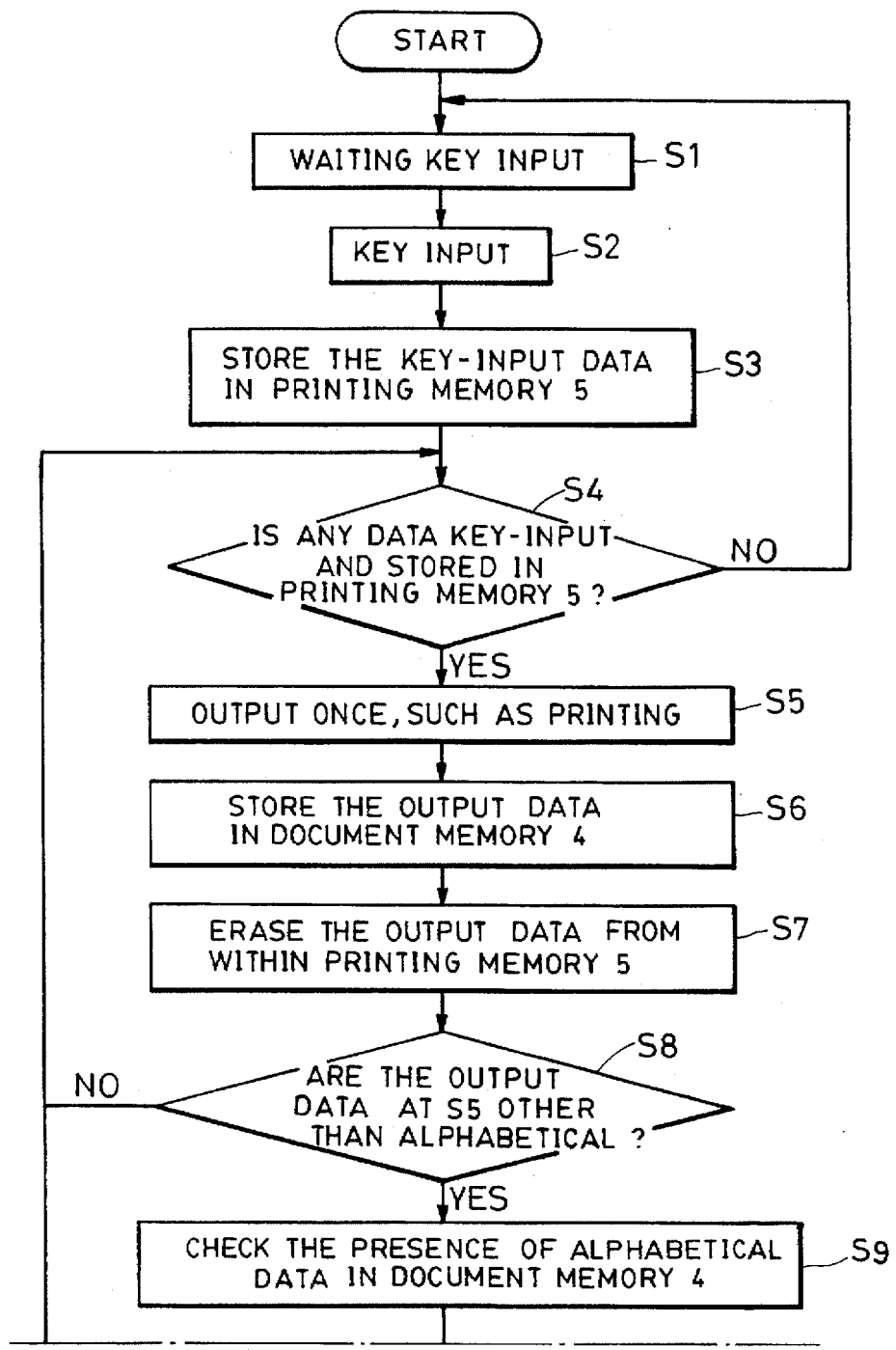
FIG. 3 is a a diagram of the relationship between FIGS. 3A and 3B.

In the embodiment of the present invention consisting of the above-described configuration, the control procedure for indicating a wrong spelling to the user will be hereinafter explained in accordance with the flow chart shown in FIG. 3.

EXAMPLE 1

First, step S1 is a key-input-waiting state after power from a power supply is applied. It will be noted that the procedure may include an L/L (line-line) mode (in which after the input of one line has been completed, the printing of the one line is performed), a W/W (word-word) mode (in which before the input of one word has been completed, the printing of the one word is performed) and a C/C (character-character) mode (in which every time one character has been input, the printing of the one character is performed), and may proceed to the present flow chart when the C/C mode has been selected. At step S2, key input is performed by the keyboard 9. At step S3, the key-input character, space, or the like, is stored in the printing memory 5.

At the next step S4, whether any data are stored in the printing memory or not is determined by CPU 1. When any data are stored in the printing memory 5 at step S4, the procedure proceeds to step S5. In the case of no stored data, the procedure returns to step S1 which is the key-input-waiting state.

At step S5, an output operation, such as printing, space operation or the like, is performed once, and the output data are stored in the document memory 4 at the next step S6. At the next step S7, the output data at step S5 are erased from within the printing memory 5.

Then, the procedure is shifted to step S8, where it is determined by CPU 1 whether the output data at step S5 are other than alphabetical or not. In the case of alphabetical data, the procedure returns to step S4, and control is executed again from step S4. In the case of other than alphabetical data, such as punctuation or a space or the like, the procedure proceeds to the next step S9.

At step S9, the presence of alphabetical data within the document memory 4 is checked by CPU 1. Then, the procedure proceeds to step S10, where CPU 1 determines whether alphabetical data exists in the document memory 4 or not.

When alphabetical data exists in the document memory 4, the procedure proceeds to step S11. When alphabetical data does not exist, the procedure returns to step S4, and control is executed again from step S4. At step S11, the spelling of the word in the document memory 4 is compared by CPU 1 with a word or words in the dictionary 7 within the ROM pack 6, and the correctness of the word is checked by CPU 1. Thus, in the so-called character/character (C/C) mode, a spelling check is performed every time a word is input and printed. Similar spelling check is performed every time a word is printed in the L/L and W/W modes.

At the next step S12, CPU 1 determines whether the result of the spelling check is correct or not. When the result is not correct, the procedure proceeds to step S14. When the result is correct, the procedure proceeds to step S13, and, after the entire content stored in the document memory 4 has been erased, returns to step S4, and the same procedure is performed again from step S4.

At step S14, CPU 1 determines by computation whether there is a difference in the number of characters in the wrong-spelled word and the word deemed as the correct word which is the basis of the determination. In the case of no difference, the procedure proceeds to step S15. When a difference exists, the procedure proceeds to step S17.

At step S15, only wrong characters among characters which constitute the word are erased from the printed paper by the correction tape, and the procedure proceeds to step S16.

At step S16, correct characters are printed at erased portions, and the procedure proceeds to step S13. The same procedure is now performed as when CPU 1 determines that the spell checked word is correct in step S12, that is, CPU 1 erases the entire content of document memory 4.

At step S17, as in the example "MANUAL" shown in FIG. 4, the wrong character (in the case of the example, U) and characters after the wrong character (in the case of the example, AL) are erased from the printed paper using the correction tape. After erasure, at step S17, correct characters (in the case of the example, NUAL) are printed from the portion where the erasure has been commenced, i.e., from the portion where "U" has been printed, at step S17, and the procedure proceeds to the next step S19.

At step S19, the data which has been the trigger for moving control to step S9, such as a space or the like, is output. Then, the procedure proceeds to step S13, and the entire content within the document memory 4 is erased. The same procedure is now performed as when CPU 1 determines that the spell checked word is correct in step S12, that is, CPU 1 erases the entire content of document memory 4.

EXAMPLE 2

It is within the scope of the present invention for CPU 1 to omit step S14 and subsequently to instruct the erasure of the entire wrong word and to instruct the printing of the correct word, so that the same effect as in Example 1 can be obtained.

EXAMPLE 3

In Example 1, a description has been provided for the case where the alphabetical elements constitute the word. However, the invention is not limited to correcting alphabetical words, but is equally applicable to correcting words made of nonalphabetical characters. This can also be accomplished using the device shown in FIGS. 1 and 2.

EXAMPLE 4

In the above-described embodiments, an explanation has been provided about a procedure in which, even when plural candidates for the correct word exist, the wrong word is corrected by the word which is expected to be the best suited among the candidates. However, this may lead to the printing of a word originally not desired by the user. When the user does not desire this situation, the same effect can be obtained using the device shown in FIGS. 1 and 2, with a buzzer added thereto, as shown in FIG. 5, by performing a method in which steps S20 and S21 are added to the flow chart shown in FIG. 3, and in which the method from step S14 to S19 in Example 1 is performed when there is only one candidate for the correct word. When plural candidates for the correct word exist, signaling by a buzzer is performed at step 21 under control of CPU 1, and the procedure from step S13 is performed. Otherwise, a display unit (though not illustrated) may display candidates, and the operator may select the desired candidate. In this case, the correct word can be more promptly checked before the next input or printing.

It is within the scope of the present invention for the user, rather than CPU 1 to determine the number of candidates for the correct word at step S20, thereby obtaining the same effect.

As described above, even in an electronic typewriter which does not include a display unit, such as an LCD, the present invention makes it possible for the user precisely to be informed of a wrong-spelled word without the key-input operation being interrupted during the middle of the key-input operation, by providing means for automatically printing a part of or the entire correct word, after a part of or the entire word, detemined by CPU 1 to be misspelled, has been erased. The present invention also makes it possible for the user to be informed of the correct spelling of a wrong-spelled word. Further, the present invention renders unnecessary the use of a special operation, such as utilizing a half space in printing the correct word, when spell checking a misspelled word, erasing the misspelled word, printing the correct word, and printing the next word.

As explained above, in the present invention, a spelling check is performed before commencing the printing of the next word, and after a part of or the entire word determined to be misspelled as a result of the spelling check has been erased, a part of or the entire correct word is automatically printed. Hence, in the present invention even an electronic typewriter without a display unit, such as an LCD, can have a spelling-correction function in which the correct word can be easily printed without decreasing the efficiency of the key-input operation. Moreover, since the electronic typewriter of the present invention has the function of automatically printing the correct word, the present invention substantially improves the efficiency of document preparation in an eletronic typewriter having a spelling-correction function.

According to the present invention, by providing means for automatically printing, after a part of or the entire word determined as misspelled as a result of a spelling check has been erased, a part of or the entire word having the correct spelling, it is possible to easily perform a simple spelling correction even in an electronic typewriter which performs inputting and printing in the C/C mode, and further to improve the efficiency of document preparation.

According to the present invention, it is also possible to check the spelling of the printed word before the inputting and printing of the next word.

The individual components represented by the blocks shown in FIGS. 1 and 2 are all well known in the printing art and their specific construction and operation is not critical to the operation or best mode for carrying out the invention. Moreover, the steps illustrated in FIGS. 3A, 3B, 5A, and 5B can be easily programmed into well known central processing units by persons of ordinary skill and since such programming per se is not part of this invention no further description thereof is deemed necessary.

What is claimed is:

1. A printing device comprising:
    input means for inputting information, comprising a plurality of characters comprising words and a plurality of symbols;
    output means for printing or erasing characters or symbols;
    determining means for determining whether the information indicating the end of a word is inputted each time one character or one symbol is inputted by said input means;
    dictionary means for storing a plurality of correctly-spelled words;
    checking means for checking the correctness of the spelling of a word which has been inputted each time a whole word is inputted by said input means in response to said determining means determining that the information indicating the end of the input word has been inputted by said input means;
    recognizing means for recognizing a correctly spelled word corresponding to an input word if the input word is determined to be a misspelled word as the result of the checking by said checking means;
    discriminating means for discriminating whether the number of characters in the misspelled word accords with the number of characters in the corresponding correctly spelled word; and
    control means for controlling said output means to selectively erase correct characters in the misspelled word, depending on whether the number of characters of the misspelled word is discriminated to accord with that of the corresponding correctly spelled word by erasing only wrong characters in the misspelled word if the number of characters of the misspelled word is discriminated to accord with that of the corresponding correctly spelled word, and erasing a first wrong character which is the first wrong character to appear in the misspelled word and to always erase all the characters subsequent to the first wrong character in the misspelled word even if some or all of the subsequent characters are correct and match the corresponding characters of the corresponding correctly spelled word if the number of characters of the misspelled word is discriminated not to accord with the number of characters of the corresponding correctly spelled word.

2. A printing device according to claim 1, wherein said output means is arranged to perform an output operation each time a character or symbol is input by said input means, and said determining means comprises means for recognizing a symbol representing a space or the latest input punctuation as the information indicating the end of a word.

3. A printing device comprising:
    input means for inputting information comprising characters and a symbol;
    printing means for printing the characters and the symbol inputted by said input means;
    determining means for determining whether the information indicating the end of a word is inputted each time one character or one symbol is inputted by said input means;
    dictionary means for storing a plurality of correctly-spelled words;
    checking means for checking the spelling of a word that has been printed by utilizing said dictionary means each time a whole word is printed by said printing means when said determining means determines that the information indicating the end of the input word is inputted;
    recognizing means for recognizing a correct word corresponding to the input word if the input word is determined to be a misspelled word as the result of the checking by said checking means;
    computing means for computing, when said checking means determines that the word that has been printed is misspelled, the difference in the number of characters between the misspelled printed word and the correct word corresponding to the misspelled printed word;
    erasing means for erasing printed characters; and
    erasing control means for controlling said erasing means to selectively erase correct characters in the misspelled word, depending on whether the number of characters in the misspelled printed word is computed to be equal to the number of characters in a correct word corresponding to misspelled printed word in response to said checking means determining that the word that has been printed is misspelled and said computing means computing the difference in the number of characters between the misspelled printed word and the correct word corresponding to the misspelled printed word so that, when the number of characters in the misspelled printed word is different from the number of characters in the corresponding correct word according to the result of the operation of said computing means, a first wrong character which is the first wrong character to appear in the misspelled printed word and all characters subsequent to the first wrong character in the misspelled printed word are always erased, even if some or all of the subsequent characters are correct and match the corresponding characters of the corresponding correct word and when the number of characters in the misspelled printed word is equal to the number of characters in the corresponding correct word, only the wrong characters within the misspelled printed word are erased.

4. A printing device according to claim 3 further comprising:
    means for reading out the correctly spelled word, corresponding to the misspelled plurality of printed characters, from within said dictionary means after the erasure of a part of or the entire misspelled plurality of printed characters by said erasing means, and means for instructing the printing of a part of or the entire correctly spelled word at the erased portion by said printing means.

5. A printing device according to claim 3, further comprising means for performing space processing after said erasing control means erases the portion of the misspelled printed word after a wrong character within the misspelled printed word, and then prints the correct characters.

6. A method of correcting a misspelled printed word comprising the steps of:
   inputting information, comprising a plurality of characters comprising words and a plurality of symbols;
   printing input characters and symbols;
   determining whether the information indicating the end of an input word is inputted each time one character or one symbol is inputted;
   checking the correctness of the spelling of a word which has been inputted by utilizing a dictionary for storing a plurality of correctly-spelled words each time a whole word is inputted in response to said determining step determining that the information indicating the end of the input word has been inputted;
   recognizing a correctly spelled word corresponding to an input word if the input word is determined to be a misspelled word as the result of said checking step;
   discriminating whether the number of characters in the misspelled word accords with the number of characters in the corresponding correctly spelled word; and
   selectively erasing correct characters in the misspelled word, depending on whether the number of characters in the misspelled word is discriminated to accord with that of the corresponding correctly spelled word by erasing only wrong characters in the misspelled word if the number of characters of the misspelled word is discriminated to accord with that of the corresponding correctly spelled word, and always erasing a first wrong character which is the first wrong character to appear in the misspelled word and all characters subsequent to the first wrong character in the misspelled word even if some or all of the subsequent characters are correct and match the corresponding characters of the corresponding correctly spelled word if the number of characters of the misspelled word is discriminated not to accord with the number of characters of the corresponding correctly spelled word.

7. A printing device comprising:
   input means for inputting information, comprising a plurality of characters comprising words and a plurality of symbols;
   output means for printing or erasing characters or symbols;
   determining means for determining whether the information indicating the end of a word is inputted each time one character or one symbol is inputted by said input means;
   dictionary means for storing a plurality of correctly-spelled words;
   checking means for checking the correctness of the spelling of a word which has been inputted each time a whole word is inputted by said input means in response to said determining means determining that the information indicating the end of the input word has been inputted by said input means;
   recognizing means for recognizing only one correctly spelled word corresponding to an input word if the input word is determined to be a misspelled word as the result of the checking by said checking means;
   discriminating means for discriminating whether the number of characters in the misspelled word accords with the number of characters in the corresponding correctly spelled word; and
   control means for controlling, when the user has input the input word and has not input any additional information after the input word with said input means, said output means to selectively erase correct characters in the misspelled word, depending upon whether the number of characters in the misspelled word accords with that of the corresponding correctly spelled word by erasing only wrong characters in the misspelled word if the number of characters of the misspelled word accords with that of the corresponding correctly spelled word, and for controlling said output means to always erase a first wrong character and all characters subsequent to the first wrong character in the misspelled word if the number of characters of the misspelled word does not accord with the number of characters of the corresponding correctly spelled word.

8. A printing device comprising:
   input means for inputting information comprising characters and a symbol;
   printing means for printing the characters and the symbol inputted by said input means;
   determining means for determining whether the information indicating the end of a word is inputted each time one character or one symbol is inputted by said input means;
   dictionary means for storing a plurality of correctly-spelled words;
   checking means for checking the spelling of a word that has been printed each time a whole word is printed by said printing means when said determining means determines that the information indicating the end of the input word is inputted;
   recognizing means for recognizing only one correct word corresponding to the input word if the input word is determined to be a misspelled word as the result of the checking by said checking means;
   computing means for computing, when said checking means determines that the word that has been printed is misspelled, the difference in the number of characters between the misspelled printed word and the correct word corresponding to the misspelled printed word;
   erasing means for erasing printed characters; and
   erasing control means for controlling said erasing means to selectively erase correct characters in the misspelled word, depending on whether the number of characters of the misspelled word is computed to be equal to the number of characters in a corresponding correct word, when the user has input the input word and has not input any additional information after the input word with said input means in response to said checking means determining that the word that has been printed is misspelled and said computing means computing the difference in the number of characters between the misspelled printed word and the correct word corresponding to the misspelled printed word so that, when the number of characters in the misspelled printed word is different from the number of characters in the corresponding correct word according to the result of the operation of said computing means, a first wrong character and all characters subsequent to the first wrong character in the misspelled printed word are always erased, and when the number of characters in the misspelled printed word is equal to the number of characters in the corresponding correct word, only the wrong characters within the misspelled printed word are erased.

9. A method of correcting a misspelled printed word comprising the steps of:

inputting information, comprising a plurality of characters comprising words and a plurality of symbols;

printing input characters and symbols;

determining whether the information indicating the end of an input word is inputted each time one character or one symbol is inputted;

checking the correctness of the spelling of a word which has been inputted by utilizing a dictionary for storing a plurality of correctly-spelled words each time a whole word is inputted in response to said determining step determining that the information indicating the end of the input word has been inputted;

recognizing only one correctly spelled word corresponding to an input word if the input word is determined to be a misspelled word as the result of said checking step;

discriminating whether the number of characters in the misspelled word accords with the number of characters in the corresponding correctly spelled word; and selectively erasing, when the user has input the input word and has not input any additional information after the input word in said inputting step, correct characters in the misspelled word, depending on whether the number of characters of the misspelled word accords with that of the corresponding correctly spelled word by erasing only wrong characters in the misspelled word if the number of characters of the misspelled word accords with that of the corresponding correctly spelled word, and always erasing a first wrong character and all characters subsequent to the first wrong character in the misspelled word if the number of characters of the misspelled word do not accord with the number of characters of the corresponding correctly spelled word.

10. A printing device having a spell checking and correcting function which is unable to display correctly spelled words corresponding to misspelled words, said printing device comprising:

input means for inputting information, comprising a plurality of characters comprising words and a plurality of symbols;

output means for printing or erasing characters or symbols;

determining means for determining whether the information indicating the end of a word is inputted each time one character or one symbol is inputted by said input means;

dictionary means for storing a plurality of correctly-spelled words which are unable to be displayed by said printing device;

checking means for checking the correctness of the spelling of a word which has been inputted each time a whole word is inputted by said input means in response to said determining means determining that the information indicating the end of the input word has been inputted by said input means;

recognizing means for recognizing a correctly spelled word corresponding to an input word if the input word is determined to be a misspelled word as the result of the checking by said checking means without displaying the correctly spelled word;

discriminating means for discriminating whether the number of characters in the misspelled word accords with the number of characters in the corresponding correctly spelled word; and control means for controlling said output means to selectively erase correct characters in the misspelled word, depending on whether the number of characters of the misspelled word is discriminated to accord with that of the corresponding correctly spelled word by erasing only wrong characters in the misspelled word if the number of characters of the misspelled word is discriminated to accord with that of the corresponding correctly spelled word, and erasing a first wrong character which is the first wrong character to appear in the misspelled word and to always erase all the characters subsequent to the first wrong character in the misspelled word even if some or all of the subsequent characters are correct and match the corresponding characters of the corresponding correctly spelled word if the number of characters of the misspelled word is discriminated not to accord with the number of characters of the corresponding correctly spelled word.

11. A printing device having a spell checking and correcting function which is unable to display correctly spelled words corresponding to misspelled words, said printing device comprising:

input means for inputting information comprising characters and a symbol;

printing means for printing the characters and the symbol inputted by said input means;

determining means for determining whether the information indicating the end of a word is inputted each time one character or one symbol is inputted by said input means;

dictionary means for storing a plurality of correctly-spelled words which are unable to be displayed by said printing device;

checking means for checking the spelling of a word that has been printed by utilizing said dictionary means each time a whole word is printed by said printing means when said determining means determines that the information indicating the end of the input word is inputted;

recognizing means for recognizing a correct word corresponding to the input word if the input word is determined to be a misspelled word as the result of the checking by said checking means without displaying the correct word;

computing means for computing, when said checking means determines that the word that has been printed is misspelled, the difference in the number of characters between the misspelled printed word and the correct word corresponding to the misspelled printed word;

erasing means for erasing printed characters; and erasing control means for controlling said erasing means to selectively erase correct characters in the misspelled word, depending on whether the number of characters in the misspelled printed word is computed to be equal to the number of characters in a correct word corresponding to misspelled printed word in response to said checking means determining that the word that has been printed is misspelled and said computing means computing the difference in the number of characters between the misspelled printed word and the correct word corresponding to the misspelled printed word so that, when the number of characters in the misspelled printed word is different from the number of characters in the corresponding correct word according to the result of the operation of said computing means, a first wrong character which is the first wrong character to appear in the misspelled printed word and all characters subsequent to the first wrong character in the misspelled printed word are always erased, even if some or all of the subsequent characters are correct and match the corresponding characters of the corresponding correct word and wherein when the number of characters in the misspelled printed word is equal to the number of characters in the corresponding correct word, only the wrong characters within the misspelled printed word are erased.

12. A method of correcting a misspelled printed word with a printing device which is unable to display correctly spelled words corresponding to misspelled words, said method comprising the steps of:

inputting information, comprising a plurality of characters comprising words and a plurality of symbols with the printing device;

printing input characters and symbols with the printing device;

determining whether the information indicating the end of an input word is inputted each time one character or one symbol is inputted with the printing device;

checking the correctness of the spelling of a word which has been inputted by utilizing a dictionary for storing a plurality of correctly-spelled words, which are unable to be displayed by the printing device, each time a whole word is inputted in response to said determining step determining that the information indicating the end of the input word has been inputted;

recognizing a correctly spelled word corresponding to an input word if the input word is determined to be a misspelled word as the result of said checking step without displaying the correctly spelled word with the printing device;

discriminating whether the number of characters in the misspelled word accords with the number of characters in the corresponding correctly spelled word with the printing device; and selectively erasing correct characters in the misspelled word, depending on whether the number of characters in the misspelled word is discriminated to accord with that of the corresponding correctly spelled word by erasing only wrong characters in the misspelled word if the number of characters of the misspelled word is discriminated to accord with that of the corresponding correctly spelled word, and always erasing a first wrong character which is the first wrong character to appear in the misspelled word and all characters subsequent to the first wrong character in the misspelled word even if some or all of the subsequent characters are correct and match the corresponding characters of the corresponding correctly spelled word if the number of characters of the misspelled word is discriminated not to accord with the number of characters of the corresponding correctly spelled word with the printing device.

13. A printing device having a spell checking and correcting function which is unable to display correctly spelled words corresponding to misspelled words, said printing device comprising:

input means for inputting information, comprising a plurality of characters comprising words and a plurality of symbols;

output means for printing or erasing characters or symbols;

determining means for determining whether the information indicating the end of a word is inputted each time one character or one symbol is inputted by said input means;

dictionary means for storing a plurality of correctly-spelled words which are unable to be displayed by said printing device;

checking means for checking the correctness of the spelling of a word which has been inputted each time a whole word is inputted by said input means in response to said determining means determining that the information indicating the end of the input word has been inputted by said input means;

recognizing means for recognizing only one correctly spelled word corresponding to an input word if the input word is determined to be a misspelled word as the result of the checking by said checking means without displaying the correctly spelled word;

discriminating means for discriminating whether the number of characters in the misspelled word accords with the number of characters in the corresponding correctly spelled word; and control means for controlling, when the user has input the input word and has not input any additional information after the input word with said input means, said output means to selectively erase correct characters in the misspelled word, depending upon whether the number of characters in the misspelled word accords with that of the corresponding correctly spelled word by erasing only wrong characters in the misspelled word if the number of characters of the misspelled word accords with that of the corresponding correctly spelled word, and for controlling said output means to always erase a first wrong character and all characters subsequent to the first wrong character in the misspelled word if the number of characters of the misspelled word does not accord with the number of characters of the corresponding correctly spelled word.

14. A printing device having a spell checking and correcting function which is unable to display correctly spelled words corresponding to misspelled words, said printing device comprising:

input means for inputting information comprising characters and a symbol;

printing means for printing the characters and the symbol inputted by said input means;

determining means for determining whether the information indicating the end of a word is inputted each time one character or one symbol is inputted by said input means;

dictionary means for storing a plurality of correctly-spelled words which are unable to be displayed by said printing device;

checking means for checking the spelling of a word that has been printed each time a whole word is printed by said printing means when said determining means determines that the information indicating the end of the input word is inputted;

recognizing means for recognizing only one correct word corresponding to the input word if the input word is determined to be a misspelled word as the result of the checking by said checking means without displaying the correct word;

computing means for computing, when said checking means determines that the word that has been printed is misspelled, the difference in the number of characters between the misspelled printed word and the correct word corresponding to the misspelled printed word;

erasing means for erasing printed characters; and erasing control means for controlling said erasing means to selectively erase correct characters in the misspelled word, depending on whether the number of characters of the misspelled word is computed to be equal to the number of characters in a corresponding correct word, when the user has input the input word and has not input any additional information after the input word with said input means in response to said checking means determining that the word that has been printed is misspelled and said computing means computing the difference in the number of characters between the misspelled printed word and the correct word corresponding to the misspelled printed word so that, when the number of characters in the misspelled printed word is different from the number of characters in the corresponding correct word according to the result of the operation of said computing means, a first wrong character and all characters subsequent to the first wrong character in the misspelled printed word are always erased, and wherein when the number of characters in the misspelled printed word is equal to the number of characters in the corresponding correct word, only the wrong characters within the misspelled printed word are erased.

15. A method of correcting a misspelled printed word with a printing device which is unable to display correctly spelled words corresponding to the misspelled printed word, said method comprising the steps of:

inputting information, comprising a plurality of characters comprising words and a plurality of symbols into the printing device;

printing input characters and symbols with the printing device;

determining whether the information indicating the end of an input word is inputted each time one character or one symbol is inputted with the printing device;

checking the correctness of the spelling of a word which has been inputted by utilizing a dictionary for storing a plurality of correctly-spelled words each time a whole word is inputted in response to said determining step determining that the information indicating the end of the input word has been inputted with the printing device which is unable to display the correctly spelled words;

recognizing only one correctly spelled word corresponding to an input word if the input word is determined to be a misspelled word as the result of said checking step without displaying the correctly spelled word with the printing device;

discriminating whether the number of characters in the misspelled word accords with the number of characters in the corresponding correctly spelled word with the printing device; and selectively erasing, when the user has input the input word and has not input any additional information after the input word in said inputting step, correct characters in the misspelled word, depending on whether the number of characters of the misspelled word accords with that of the corresponding correctly spelled word by erasing only wrong characters in the misspelled word if the number of characters of the misspelled word accords with that of the corresponding correctly spelled word, and always erasing a first wrong character and all characters subsequent to the first wrong character in the misspelled word if the number of characters of the misspelled word do not accord with the number of characters of the corresponding correctly spelled word with the printing device.

* * * * *

UNITED STATES PATENT AND TRADEMARK OFFICE
CERTIFICATE OF CORRECTION

PATENT NO. : 5,745,911
DATED : April 28, 1998
INVENTOR(S) : Sugiyama

It is certified that error appears in the above-indentified patent and that said Letters Patent is hereby corrected as shown below:

Column 3:

Line 21, "a" (second occurrence) should be deleted.

COLUMN 4:

Line 2, "is" should be deleted.
Line 27, "in" should read --In--.

COLUMN 6:

Line 34, "wrong-spelled" should read --wrongly-spelled--.
Line 62, "automatically" should read --automatic--.

COLUMN 7:

Line 66, "the latest input" should read --a--.
Line 67, "a" should read --the latest input--.

Signed and Sealed this

Seventeenth Day of August, 1999

Attest:

Q. TODD DICKINSON

*Attesting Officer*    *Acting Commissioner of Patents and Trademarks*